United States Patent
Liu et al.

(10) Patent No.: US 10,628,168 B2
(45) Date of Patent: Apr. 21, 2020

(54) MANAGEMENT WITH RESPECT TO A BASIC INPUT/OUTPUT SYSTEM POLICY

(71) Applicant: HEWLETT-PACKARD DEVELOPMENT COMPANY, L.P., Houston, TX (US)

(72) Inventors: Wei Ze Liu, Spring, TX (US); Rosilet Retnamoni Braduke, Houston, TX (US); Rajesh A. Shah, Spring, TX (US); Lan Wang, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 187 days.

(21) Appl. No.: 15/749,106

(22) PCT Filed: Jan. 14, 2016

(86) PCT No.: PCT/US2016/013317
§ 371 (c)(1),
(2) Date: Jan. 30, 2018

(87) PCT Pub. No.: WO2017/123225
PCT Pub. Date: Jul. 20, 2017

(65) Prior Publication Data
US 2018/0225126 A1 Aug. 9, 2018

(51) Int. Cl.
*G06F 11/20* (2006.01)
*G06F 9/4401* (2018.01)
(Continued)

(52) U.S. Cl.
CPC ........... *G06F 9/4403* (2013.01); *G06F 11/14* (2013.01); *G06F 11/1417* (2013.01); *G06F 11/3013* (2013.01); *G06F 11/3072* (2013.01); *G06F 21/572* (2013.01); *G06F 9/4401* (2013.01); *G06F 11/2284* (2013.01); *G06F 21/57* (2013.01); *G06F 2201/86* (2013.01)

(58) Field of Classification Search
CPC .... G06F 11/1417; G06F 21/57; G06F 21/572; G06F 21/575; G06F 8/654; G06F 9/4401; G06F 9/4416
See application file for complete search history.

(56) References Cited

U.S. PATENT DOCUMENTS 7,840,656 B2   11/2010  Holdaway et al.
7,904,708 B2   3/2011   Harmer
(Continued)

FOREIGN PATENT DOCUMENTS

EP      2607987 A1        6/2013
WO   WO-2014175864 A1 *  10/2014
(Continued)

OTHER PUBLICATIONS

Microsoft, "Introduction of Out of Band Management in Configuration Manager," Updated May 14, 2015, 2 p.

*Primary Examiner* — Joseph O Schell
(74) *Attorney, Agent, or Firm* — HPI Patent Department

(57) ABSTRACT

In some examples, an embedded controller in a system monitors a basic input/output system (BIOS) policy stored in a non-volatile storage, and executes a management action with respect to the BIOS policy, where the monitoring and the executing are performed by the embedded controller independent of instructions executed by a processor in the system.

12 Claims, 4 Drawing Sheets

(51) Int. Cl.
*G06F 11/14* (2006.01)
*G06F 11/30* (2006.01)
*G06F 21/57* (2013.01)
*G06F 11/22* (2006.01)

(56) References Cited

U.S. PATENT DOCUMENTS

| | | | |
|---|---|---|---|
| 8,745,364 B2 | 6/2014 | Rothman et al. | |
| 9,038,130 B2* | 5/2015 | Gillon | G06F 21/00 |
| | | | 726/1 |
| 9,846,584 B1* | 12/2017 | Khoruzhenko | G06F 9/4416 |
| 10,169,052 B2* | 1/2019 | Jeansonne | G06F 21/572 |
| 2005/0229173 A1* | 10/2005 | Mihm | G06F 8/65 |
| | | | 717/171 |
| 2006/0136703 A1* | 6/2006 | Wisecup | G06F 9/4416 |
| | | | 713/2 |
| 2009/0172639 A1* | 7/2009 | Natu | G06F 21/57 |
| | | | 717/120 |
| 2010/0325351 A1* | 12/2010 | Bennett | G06F 12/0246 |
| | | | 711/103 |
| 2014/0047229 A1 | 2/2014 | Wiseman | |
| 2014/0137095 A1* | 5/2014 | Chiu | G06F 8/654 |
| | | | 717/171 |
| 2014/0298003 A1* | 10/2014 | Ali | G06F 9/45558 |
| | | | 713/2 |
| 2015/0143095 A1* | 5/2015 | Maity | G06F 11/1417 |
| | | | 713/2 |
| 2015/0154091 A1* | 6/2015 | Chen | G06F 11/2284 |
| | | | 713/2 |
| 2016/0063255 A1* | 3/2016 | Jeansonne | G06F 9/4401 |
| | | | 713/2 |
| 2016/0147540 A1* | 5/2016 | Chiu | G06F 8/654 |
| | | | 714/23 |
| 2017/0085383 A1* | 3/2017 | Rao | H04L 9/3234 |

FOREIGN PATENT DOCUMENTS

| | | |
|---|---|---|
| WO | WO-2014175864 A1 | 10/2014 |
| WO | WO-2014175867 A1 | 10/2014 |

\* cited by examiner

MANAGEMENT WITH RESPECT TO A BASIC INPUT/OUTPUT SYSTEM POLICY

BACKGROUND

A computing system can include code to perform various startup functions of the computing system. This code can include Basic Input/Output System (BIOS) code. The BIOS code is executed when the computing system initially starts up, and can be executed in response to other events.

BRIEF DESCRIPTION OF THE DRAWINGS

Some implementations of the present disclosure are described with respect to the following figures.

DETAILED DESCRIPTION

Figure 1:
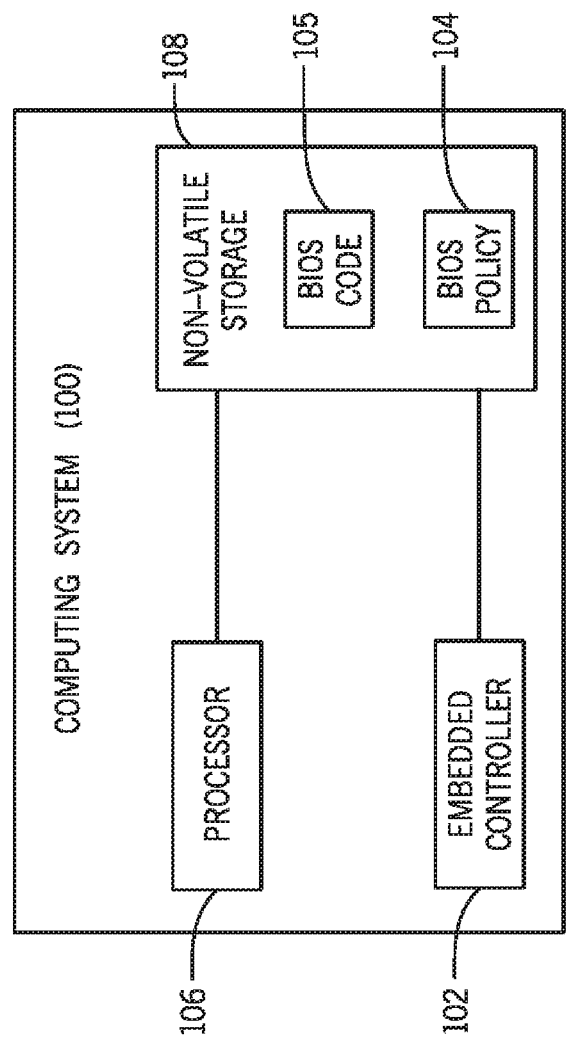
FIG. 1 is a block diagram of an example computing system according to some implementations.

System code used to perform startup of a computing system can include system firmware, which can be in the form of machine-readable instructions executable on a processor (or processors) of the computing system. "System firmware" can refer to any machine-readable instructions that are able to perform startup of a computing system and other tasks. Examples of computing systems include desktop computers, notebook computers, tablet computers, personal digital assistants (PDAs), smart phones, game appliances, wearable devices (e.g. smart watches, smart eyeglasses, etc.), server computers, storage nodes, network communication nodes, vehicles, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. In some cases, the BIOS code can also perform certain tasks (runtime services) after control of the computing system has been passed to the OS.

In the present disclosure, a "BIOS" can also refer to a Unified Extensible Firmware Interface (UEFI), and "BIOS code" can also refer to "UEFI code." UEFI code can perform boot services during boot time of a computing system. UEFI code can additionally provide certain runtime services (during system runtime in which an OS is active). A version of UEFI is described by the Unified Extensible Firmware Interface Specification, Version 2.5 (April 2015).

The behavior of a BIOS code can be based on a BIOS policy (or multiple BIOS policies). The BIOS policy can be stored in a non-volatile storage. The non-volatile storage can include a non-volatile memory device (or multiple non-volatile memory devices. Examples of non-volatile memory devices include any or some combination of the following: a flash memory device, a memristor memory, spin-transfer torque memory device, a phase change memory device, or other type of memory device in which content of the memory device is maintained even when power is removed from the memory device. In further examples, the non-volatile storage can include a disk-based storage device.

Examples of BIOS policies include any or some combination of the following: a BIOS policy that specifies whether a computing system is allowed to be awakened from a lower power state (e.g. sleep state) by a message transmitted to the computing system over a network (in some examples, this feature is referred to as a wake-on-LAN (local area network) feature); a BIOS policy specifying whether to use Universal Serial Bus (USB) 2 or USB 3 mode; a BIOS specifying a boot order of different storage devices (e.g. attempt to boot from an external storage device first followed by boot from an internal storage device); and other policies.

A BIOS policy can be set by a user, such as by using a startup screen of the BIOS code. In the startup screen, the user can enable or disable certain features of the computing system, which causes corresponding BIOS policies to be stored in the non-volatile storage. In other examples, a BIOS policy can be set by code executing in the computing system, or can be provided to the computing system from an external source, such as a management server or other management entity.

A BIOS policy can become corrupted due to various causes. For example, a BIOS policy may be corrupted by malware executing in a computing system or in an external system, where the malware can tamper with the BIOS policy by changing content in the BIOS policy or replacing the BIOS policy with a different BIOS policy. A BIOS policy is also considered to be corrupted if the BIOS policy includes a setting or other information that causes the BIOS code to malfunction or return an error. Thus generally, a BIOS policy is "corrupted" if the BIOS policy has been tampered with in an unauthorized manner, or the BIOS policy includes information that causes BIOS code (or a computing system in which the BIOS code executes) to not function in an expected manner.

In some cases, a BIOS policy can be managed by a BIOS code executed on a processor of a computing system. In the ensuing discussion, reference to execution of a BIOS code or other machine-readable instructions on a processor is a reference to execution of the BIOS code or other machine-readable instructions on one processor, or on multiple processors.

The management of the BIOS policy can include any or some combination of the following example actions: monitoring the BIOS policy to determine corruption in the BIOS policy, restoring the BIOS policy (which may be corrupted) to a different version of the BIOS policy (e.g. a known good version of the BIOS policy), and reclaiming storage space in a region of a non-volatile storage used to store BIOS policies. Although specific example management actions are listed above, it is noted that in other examples, other types of management actions can be performed with respect to BIOS policies.

Performing management actions using the BIOS code can place a processing burden on the processor(s) of a computing system. While the BIOS code is performing the management actions, the processor(s) may not be available, or may have a reduced processing capacity, to perform other tasks of the computing system. Also, if the BIOS code itself becomes compromised for any reason (e.g. due to malware attack or for some other reason), then the BIOS code may no longer be able to perform management actions with respect to BIOS policies.

In accordance with some implementations, instead of or in addition to performing management actions with respect to a BIOS policy by BIOS code executed on a processor of a computing system, an embedded controller can perform management actions with respect to the BIOS policy.

FIG. 1 shows an example of a computing system 100 that includes an embedded controller 102 that is able to perform management actions with respect to a BIOS policy (or multiple BIOS policies) 104. The computing system 100 also includes a processor (or processors) 106. In the ensuing discussion, reference is made to "a processor"; however, it should be understood that "a processor" can refer to one processor or to multiple processors. A processor can include a microprocessor, a core of a multi-core microprocessor, a microcontroller, a programmable integrated circuit, a programmable gate array, or any other hardware processing circuit.

The embedded controller 102 is physically separate from the processor 106 of the computing system 100. Note that the embedded controller 102 can also refer to a super input/output (I/O) chip used to control I/O devices. The processor 106 is used for executing a BIOS code 105, an operating system (OS), an application code, and other code in the computing system 100. The term "code" can refer to machine-readable instructions that can be executed. Due to hardware separation, an OS, an application, and other system code in the computing system 100 are unable to execute in the embedded controller 102 or access any data in the embedded controller 102.

The embedded controller 102, on the other hand, can be used to perform specific predefined tasks, as programmed into embedded controller (EC) firmware (machine-readable instructions) executable by the embedded controller 102. In addition to the ability to perform management actions with respect to the BIOS policy 104, examples of other tasks that can be performed by the embedded controller 102 include any one or some combination of the following: power supply control in the computing system 100 (for controlling a power supply that supplies power supply voltages to various components in the computing system 100), charging and control of a battery in the computing system 100, thermal monitoring (to monitor a temperature in the computing system 100), fan control (to control a fan in the computing system 100), and interaction with a user input device (such as performing a scan of a keyboard of the computing system 100 or interaction with a pointing device such as a mouse, touchpad, touchscreen, and so forth). The embedded controller 102 can be implemented with a microcontroller, an application-specific integrated circuit (ASIC), a programmable gate array (PGA), or any other type of programmable circuit.

More generally, an "embedded controller" can refer to a controller, separate from the processor(s) of a computing system, that is designated to perform specified tasks in the computing system. In some examples, the embedded controller can be mounted on the same circuit board as the processor(s). In other examples, the embedded controller can be mounted on a separate circuit board than the circuit board on which the processor(s) is mounted; however, both the embedded controller and the processor(s) are provided within the same housing of the computing system.

As shown in FIG. 1, the BIOS code 105 and the BIOS policy 104 are stored in a non-volatile storage 108. The non-volatile storage 108 can be implemented with one or multiple non-volatile storage devices.

The BIOS code 105 is executable on the processor 106 during startup of the computing system 100 (prior to loading of an OS) and/or during runtime of the computing system 100 (after the OS of the computing system 100 has been loaded for execution).

As noted above, the embedded controller 102 is able to perform management actions with respect to the BIOS policy 104, based on monitoring the BIOS policy 104 that is stored in the non-volatile storage 108. In some examples, the embedded controller 102 can detect an issue associated with the BIOS policy, where the issue can be corruption or other issue of the BIOS policy that affects operation of the BIOS code 105 or the computing system 100. The monitoring that is performed by the embedded controller 102 can include monitoring for tampering of the BIOS policy 104. For example, the embedded controller 102 can compare the BIOS policy 104 to a known good version (or a backup copy) of the BIOS policy. If the compared copies do not match, then that is an indication that the BIOS policy 104 has been tampered with. In other examples, the embedded controller 102 is able to monitor for other issues associated with the BIOS policy 104.

In response to detecting the issue associated with the BIOS policy 104, the embedded controller 102 can restore a different version of the BIOS policy to the non-volatile storage 108. The restored different version of the BIOS policy can replace the BIOS policy 104, in which case the BIOS policy 104 can be removed from the non-volatile storage 108, or alternatively, the restored version of the BIOS policy can be marked as the active BIOS policy and the BIOS policy 104 can be marked as the inactive or obsolete (invalid) version.

By using techniques according to some implementations of the present disclosure, the embedded controller 102 is able to perform management actions with respect to the BIOS policy 104 even when the BIOS code 105 and/or the processor 106 are not available. For example, the BIOS code 105 may have been compromised by malware, such that the BIOS code 105 is no longer able to perform management actions with respect to the BIOS policy 104.

Although reference has been made to the embedded controller 102 performing management actions with respect to the BIOS policy 104, it is noted that in some implementations, the BIOS code 105 when executing on the processor 106 can also perform management actions with respect to the BIOS policy 104.

The non-volatile storage 108 can be a shared non-volatile storage that is accessible by both the embedded controller 102 and the processor 106. As a result, certain content (the BIOS policy 104) in the non-volatile storage 108 can be accessed (and possibly updated) by multiple entities, such as by the embedded controller 102 and the BIOS code 105 executed on the processor 106.

To avoid conflict between the processor 106 and the embedded controller 102, the embedded controller 102 can read the BIOS policy 104 in the non-volatile storage 108 at any time, but can write a BIOS policy in the non-volatile storage 108 only when the processor 106 is inactive with respect to BIOS policies (in other words, the processor 106 is not executing any code, such as BIOS code 105, which can perform rights of BIOS policies in a non-volatile storage 108).

In some implementations, in examples where the non-volatile storage 108 stores multiple BIOS policies, the embedded controller 102 is able to perform management actions with respect to just a subset (less than all) of the BIOS policies. The BIOS policies of this subset can be considered "critical" BIOS policies, as designated by a user of the computing system 100 or by code executing in the computing system 100. In contrast, in some implementations, the BIOS code 105 is able to perform management actions with respect to all of the BIOS policies stored in the non-volatile storage 108.

Figure 2:
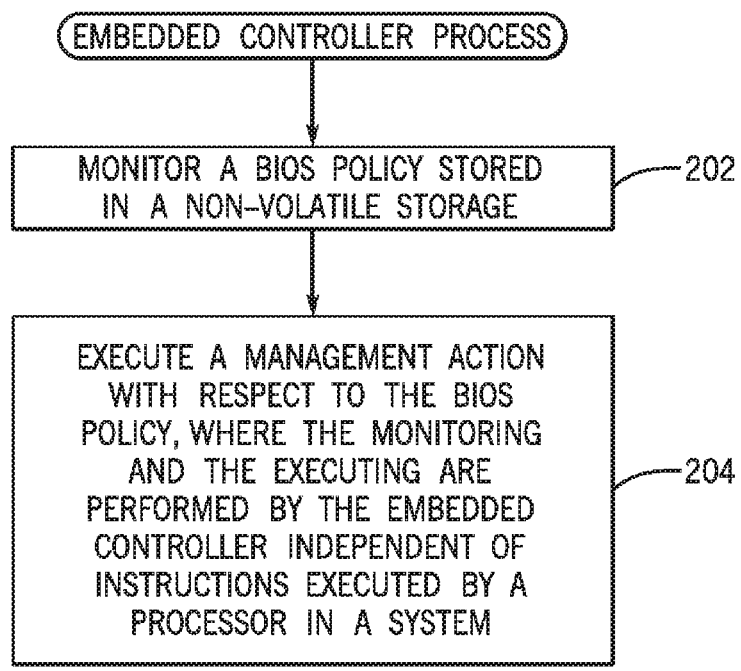
FIG. 2 is a flow diagram of an example process of an embedded controller, according to some implementations.

FIG. 2 is a flow diagram of an example process that can be performed by the embedded controller 102 according to some implementations. The embedded controller monitors (at 202) a BIOS policy (e.g. BIOS policy 104 in FIG. 1) stored in a non-volatile storage (e.g. non-volatile storage 108 in FIG. 1). The embedded controller 102 executes (at 204) a management action with respect to the BIOS policy, where the monitoring and the executing are performed by the embedded controller 102 independent of instructions executed by any processor (e.g. processor(s) 106 in the computing system 100). The executing of the management action can be in response to at least one trigger selected from among: the monitoring (at 202), a policy of the embedded controller 102, or a user request.

Figure 3:
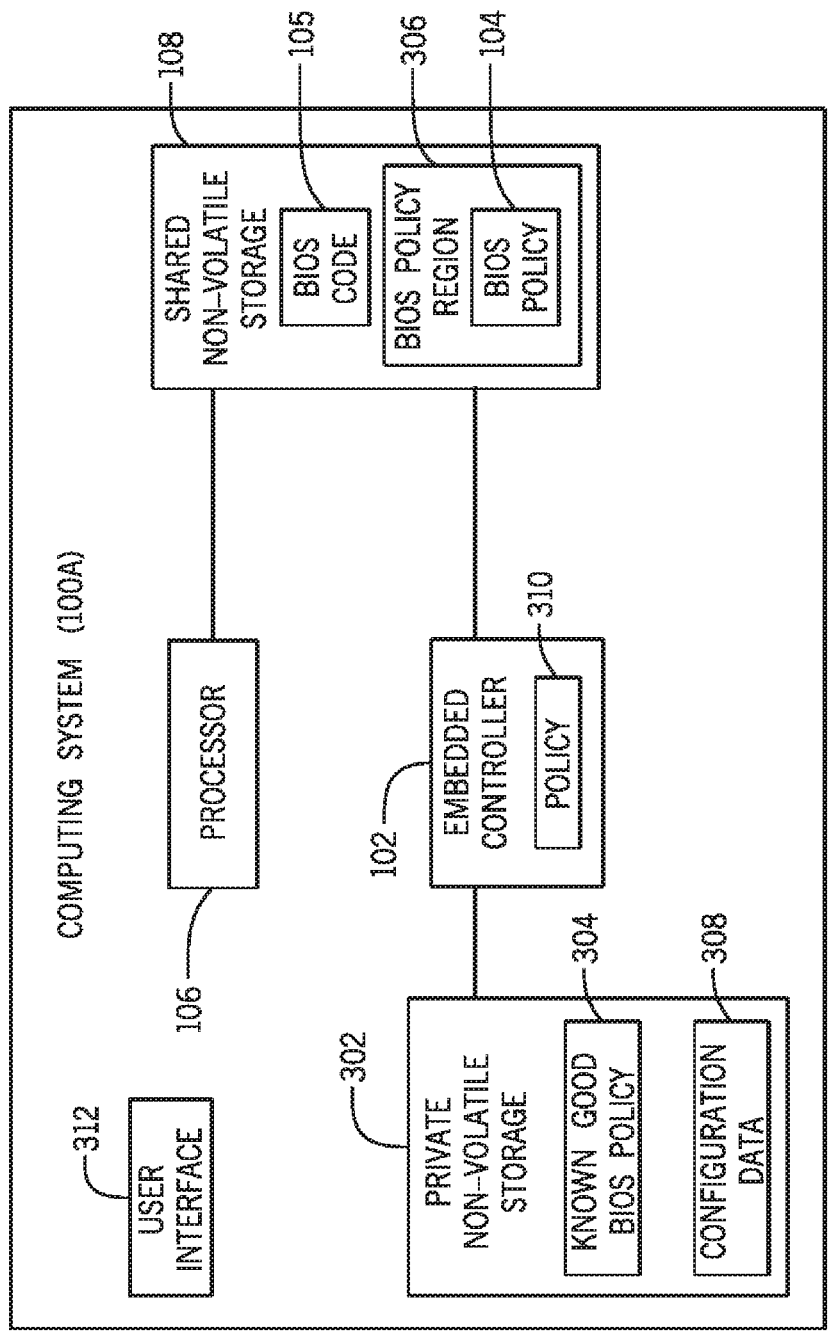
FIG. 3 is a block diagram of another example computing system according to further implementations.

FIG. 3 is a block diagram of an example computing system 100A according to alternative implementations. The computing system 100A includes the processor 106, the embedded controller 102, and the non-volatile storage 108, which is a shared non-volatile storage that is accessible by both the processor 106 and the embedded controller 102.

In addition, the computing system 100A includes a private non-volatile storage 302, which is accessible by just the embedded controller 102 (i.e. the private non-volatile storage 302 is not accessible by the processor 106 or any other entity of the computing system 100A, other than the embedded controller 102). The private non-volatile storage 302 can be implemented with one or multiple non-volatile storage devices. The private non-volatile storage 302 stores a known good BIOS policy 304, which can be a prior version of the BIOS policy 104 that has been confirmed to not have been corrupted and that is not faulty. More generally, the private non-volatile storage 302 can store a copy of a BIOS policy (or copies of BIOS policies) that can be used to restore a BIOS policy in the shared non-volatile storage 108.

In some examples, in response to detecting an issue (e.g. corruption) with respect to the BIOS policy 104 in the shared non-volatile storage 108, the embedded controller 102 can restore the known good BIOS policy 304 from the private non-volatile storage 302 to the shared non-volatile storage 108, by writing the known good BIOS policy 304 to the shared non-volatile storage such that the BIOS code 105 when executed uses the known good BIOS policy 304 rather than the BIOS policy 104 associated with the issue.

As explained above, a management action with respect to the BIOS policy 104 can be triggered in response to monitoring the BIOS policy 104. In other examples, a management action with respect to the BIOS policy can have other triggers, including a policy 310 in the embedded controller, and/or a user request received through a user interface 312. The policy 310 can be stored in a storage medium of the embedded controller 102, or can be stored in a storage medium external of the embedded controller 102 but accessible by the embedded controller 102. As examples, the policy 310 can specify times at which management actions can be performed, such as at specific times of the day or periodic intervals.

The user interface 312 can include a touchscreen display, a mouse input device, a keyboard, or any other type of user input device along with a display screen through which information can be presented to a user. A user can submit a user request through the user interface 312 to perform a management action with respect to the BIOS policy 104.

In further implementations, the embedded controller 102 is able to perform maintenance of BIOS policies stored in the non-volatile storage 108. For example, the embedded controller 102 can read the BIOS policies in the non-volatile storage 108, delete obsolete (invalid) copies of BIOS policies to keep the BIOS policy data in the non-volatile storage clean, or other management tasks. Deleting obsolete copies of BIOS policies can increase the amount of available storage of a BIOS policy region 306 in the non-volatile storage 108 that is designated to store BIOS policies. In other words, BIOS policies are allowed to be stored in the BIOS policy region 306, but not in another part of the shared non-volatile storage 108.

As BIOS policies are added to the BIOS policy region 306, the BIOS policy region 306 can become full such that the addition of a further BIOS policy to the BIOS policy region 306 may not be possible. By deleting obsolete copies of BIOS policies from the BIOS policy region 306, available storage space of the BIOS policy region 306 can be reclaimed for storing other BIOS policies.

In some examples, the embedded controller 102 can have access to configuration data 308 that specifies which of various management actions the embedded controller 102 is to perform with respect to BIOS policies. In some examples, the configuration data 308 can be stored in the private non-volatile storage 302, or alternatively in a different location, such as a storage that is part of the embedded controller 102.

The configuration data 308 can be set by a user or by code executed in the computing system 100A, or by an external entity that is external of the computing entity 100A. For example, the configuration data 308 can specify whether or not the embedded controller 102 is to perform any or some combination of the following actions: monitoring BIOS policies stored in the shared non-volatile storage 108; reclamation of the BIOS policy region 306 used to store BIOS policies (reclamation refers to deleting copies of BIOS policies to free up available space in the BIOS policy region 306 to store other BIOS policies); restoration of a known good (or different version of) BIOS policy to the shared non-volatile storage 108 in response to detecting an issue with a BIOS policy; and so forth.

The configuration data 308 can also specify the timing of when the embedded controller 102 is to perform management actions with respect to BIOS policies. For example, the configuration data 308 can specify that the embedded controller 102 is to perform management actions with respect to BIOS policies on a periodic basis (e.g. daily, weekly, or at certain times during the day).

In addition, the configuration data 308 can specify whether the embedded controller 102 is to perform backup of BIOS policies stored in the shared non-volatile storage 108 to the private non-volatile storage 302. The configuration data 308 can also specify which version of multiple known good BIOS policies to use to restore a given BIOS policy in response to detecting an issue with the given BIOS policy.

Figure 4:
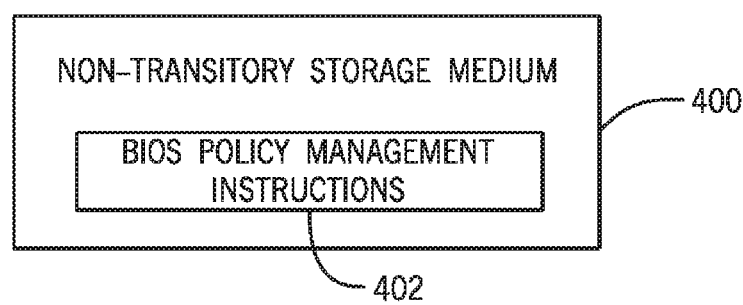
FIG. 4 is a block diagram of an example non-transitory storage medium storing machine-readable instructions according to some implementations.

FIG. 4 is a block diagram of an example non-transitory storage medium 400 that stores BIOS policy management instructions 402 that are executable by an embedded controller, such as the embedded controller 102. The BIOS policy management instructions 402 in some examples can include machine-readable instructions in the form of firmware executable by the embedded controller 102. The non-transitory storage medium 400 can be included in the embedded controller 102, or alternatively, the non-transitory storage medium 400 can be external of the embedded controller 102.

The BIOS policy management instructions 402 upon execution by the embedded controller 102 causes the embedded controller 102 in a computing system to execute management actions with respect to BIOS policies stored in a non-volatile storage (e.g., non-volatile storage 108). The executing is performed by the embedded controller 102 independent of instructions executed by any processor in the computing system. The management actions include detecting an issue associated with a BIOS policy, recovering from the issue (e.g. by replacing a corrupted BIOS policy with a different version of the BIOS policy), and reclaiming a portion of a region of the non-volatile storage storing the BIOS policies.

The storage medium 400 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   monitoring, by an embedded controller in a system, a basic input/output system (BIOS) policy stored in a non-volatile storage, the non-volatile storage accessible to a processor in the system; and
   executing, by the embedded controller, a management action with respect to the BIOS policy, wherein the monitoring and the executing are performed by the embedded controller independent of instructions executed by a processor in the system,
   wherein executing the management action comprises restoring the BIOS policy using a backup copy of the BIOS policy stored in a private non-volatile storage, the private non-volatile storage accessible to the embedded controller and inaccessible to the processor.

2. The method of claim 1, wherein executing the management action is in response to at least one trigger selected from among the monitoring, a policy of the embedded controller, or a user request.

3. The method of claim 1, further comprising:
   reclaiming, by the embedded controller, a portion of a region of the non-volatile storage used to store BIOS policies.

4. The method of claim 3, wherein reclaiming the portion of the region comprises deleting at least one BIOS policy from the region.

5. The method of claim 1, wherein the management action executed by the embedded controller is in addition to a management action performed by BIOS code executed on the processor with respect to the BIOS policy.

6. The method of claim 1, wherein the monitoring comprises comparing the BIOS policy stored in the non-volatile storage with another copy of the BIOS policy to determine whether tampering has occurred with respect to the BIOS policy.

7. The method of claim 1, further comprising setting configuration data to select which management action is to be performed by the embedded controller with respect to the BIOS policy.

8. A computing system comprising:
   a processor to execute basic input/output system (BIOS) code;
   a non-volatile storage to store a BIOS policy that governs a behavior of the BIOS code, the non-volatile storage accessible to the processor; and
   an embedded controller separate from the processor and to:
   detect an issue associated with the BIOS policy, and
   in response to detecting the issue associated with the BIOS policy, restore the BIOS policy in the non-volatile storage using a backup copy of the BIOS policy stored in a private non-volatile storage, wherein the private non-volatile storage is accessible by the embedded controller and is inaccessible by the processor.

9. The computing system of claim 8, wherein
   the embedded controller is to generate the backup copy of the BIOS policy on the private non-volatile storage.

10. The computing system of claim 8, wherein the non-volatile storage includes a region designated to store BIOS policies, and the embedded controller is to further perform reclamation with respect to the region to remove an obsolete version of a BIOS policy from the region.

11. A non-transitory storage medium storing instructions that upon execution by an embedded controller cause the embedded controller in a computing system to:
   execute management actions with respect to BIOS policies stored in a non-volatile storage accessible by processor separate from the embedded controller, wherein the executing is performed by the embedded controller independent of instructions executed by the processor in the computing system, and wherein the management actions comprise:
   detecting an issue associated with a BIOS policy of the BIOS policies, and recovering from the issue by restoring the BIOS policy using a backup copy of the BIOS policy, the backup copy of the BIOS policy stored on a private non-volatile memory accessible by the embedded controller and inaccessible to the processor, and
   reclaiming a portion of a region storing the BIOS policies in the non-volatile storage.

12. The non-transitory storage medium of claim 11, wherein the management actions executed by the embedded controller are in addition to management actions with respect to the BIOS polices performed by BIOS code executed on the processor.

\* \* \* \* \*